United States Patent [19]

Gupta et al.

[11] Patent Number: 6,009,390
[45] Date of Patent: Dec. 28, 1999

[54] TECHNIQUE FOR SELECTIVE USE OF GAUSSIAN KERNELS AND MIXTURE COMPONENT WEIGHTS OF TIED-MIXTURE HIDDEN MARKOV MODELS FOR SPEECH RECOGNITION

[75] Inventors: Sunil K. Gupta, Edison; Raziel Haimi-Cohen, Springfield; Frank K. Soong, Warren, all of N.J.

[73] Assignee: Lucent Technologies Inc., Murray Hill, N.J.

[21] Appl. No.: 08/927,883

[22] Filed: Sep. 11, 1997

Related U.S. Application Data

[60] Provisional application No. 60/025,300, Sep. 18, 1996.

[51] Int. Cl.$^6$ ...................................................... G10L 7/08
[52] U.S. Cl. ........................................ 704/240; 704/245
[58] Field of Search ................................. 704/256, 255, 704/240, 243, 245

[56] References Cited

U.S. PATENT DOCUMENTS

| | | | |
|---|---|---|---|
| 5,473,728 | 12/1995 | Luginbuhl et al. | 704/243 |
| 5,794,198 | 8/1998 | Takahashi et al. | 704/256 |
| 5,825,978 | 10/1998 | Digalakis et al. | 704/256 |

OTHER PUBLICATIONS

Digalakis, V.V.; Rtischev, D.; Neumeyer, L.G., "Speaker adaptation using constrained estimation of Gaussian mixtures," Speech and Audio Processing, IEEE Transactions on, vol. 3, No. 5, Sep. 1995, pp. 357–366.

Digalakis, V.V.; Monaco, P.; and Murveit, H., "Genones: generalized mixture tying in continuous hidden Markov model–based speech recognizers," Speech and Audio Processing, IEEE Transactions on, vol. 4 4, pp. 281–289, Jul. 1996.

J. R. Bellegarda et al., "Tied Mixture Continuous Parameter Modeling for Speech Recognition," *IEEE Trans. Acoustics Speech Signal Process.*, vol. 38, No. 12, 1990, pp. 2033–2045.

X. D. Huang et al., "Semi–Continuous Hidden Markov Models for Speech Signals," *Computer Speech and Language*, vol. 3, 1989, pp. 239–251.

E. Bocchieri, "A study of the Beam–Search Algorithm for Large Vocabulary Continuous Speech Recognition and Methods for Improved Efficiency," *Proceedings Eurospeech*, 1993, pp. 1521–1524.

Y. Linde et al., "An Algorithm for Vector Quantizer Design," *IEEE Trans. Communications*, vol. COM–28, Jan. 1980, pp. 84–95.

E. Bocchieri, "Vector Quantization for the Efficient Computation of Continuous Density Likelihoods," *IEEE*, 1993, pp. II 692–695.

P. Lockwood et al., "Experiments with a Non–Linear Spectral Subtractor (NSS), Hidden Markov Models and the Projection, for Robust Speech Recognition in Cars," *Proceedings Eurospeech*, 1993, pp. 79–82.

*Primary Examiner*—David R. Hudspeth
*Assistant Examiner*—Donald L. Storm

[57] ABSTRACT

In a speech recognition system, tied-mixture hidden Markov models (HMMs) are used to match, in the maximum likelihood sense, the phonemes of spoken words given the acoustic input thereof. In a well known manner, such speech recognition requires computation of state observation likelihoods (SOLs). Because of the use of HMMs, each SOL computation involves a substantial number of Gaussian kernels and mixture component weights. In accordance with the invention, the number of Gaussian kernels is cut down to reduce the computational complexity and increase the efficiency of memory access to the kernels. For example, only the non-zero mixture component weights and the Gaussian kernels associated therewith are considered in the SOL computation. In accordance with an aspect of the invention, only a subset of the Gaussian kernels of significant values, regardless of the values of the associated mixture component weights, are considered in the SOL computation. In accordance with another aspect of the invention, at least some of the mixture component weights are quantized to reduce memory space needed to store them. As such, the computational complexity and memory access efficiency are further improved.

32 Claims, 5 Drawing Sheets

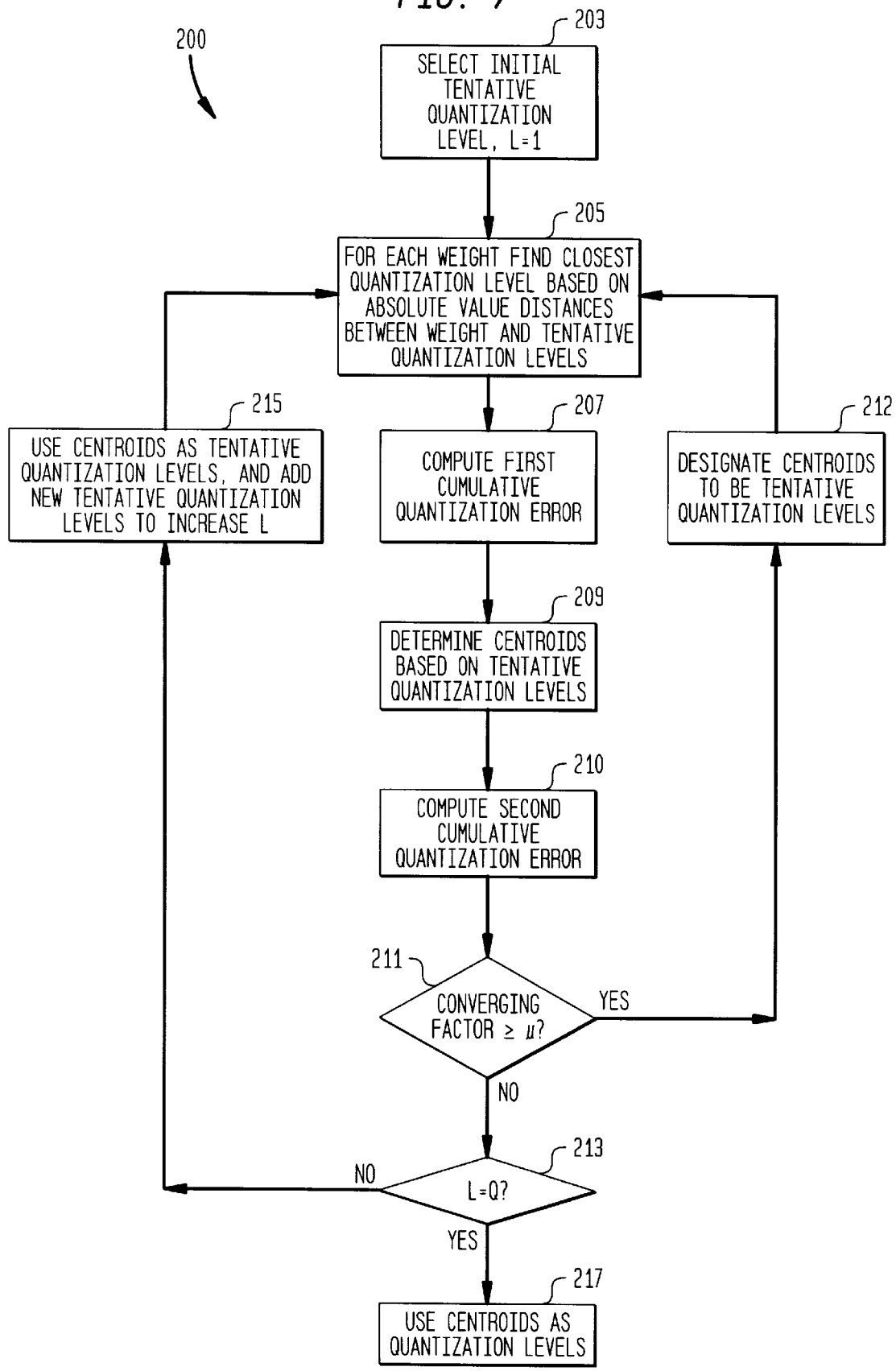

TECHNIQUE FOR SELECTIVE USE OF GAUSSIAN KERNELS AND MIXTURE COMPONENT WEIGHTS OF TIED-MIXTURE HIDDEN MARKOV MODELS FOR SPEECH RECOGNITION

This application claims priority of U.S. Provisional Application No. 60/025,300, filed on Sep. 18, 1996, now abandoned.

FIELD OF THE INVENTION

The invention relates to speech recognition systems and methods, and more particularly to systems and methods for recognizing speech based on tied-mixture hidden Markov models (HMMs).

BACKGROUND OF THE INVENTION

In communication, data processing and similar systems, a user interface using audio facilities is often advantageous especially when it is anticipated that the user would be physically engaged in an activity (e.g., driving a car) while he/she is operating one such system. Techniques for recognizing human speech in such systems to perform certain tasks have been developed.

In accordance with one such technique, input speech is analyzed in signal frames, represented by feature vectors corresponding to phonemes making up individual words. The phonemes are characterized by hidden Markov models (HMMs), and a Viterbi algorithm is used to identify a sequence of HMMs which best matches, in a maximum likelihood sense, a respective concatenation of phonemes corresponding to an unknown, spoken utterance. The Viterbi algorithm forms a plurality of sequences of tentative decisions as to what the uttered phonemes were. These sequences of tentative decisions define the so-called "survival paths." The theory of the Viterbi algorithm predicts that these survival paths merge to the "maximum-likelihood path" going back in time. See G. D. Forney, "The Viterbi Algorithm," *Proceedings of the IEEE*, Vol. 761, No. 3, March 1973, pp. 268–278. In this instance, such a maximum-likelihood path corresponds to a particular concatenation of phonemes which maximizes a cumulative conditional probability that it matches the unknown, spoken utterance given the acoustic input thereof.

In practice, in each state where a tentative decision is made, a state observation likelihood (SOL) measure, indicating the probability that a respective phoneme was uttered during the signal frame period, is derived from an HMM. As the tentative decisions are made along a sequence, the SOL measures are accumulated. Based on the respective cumulative SOL measures of the tentative decision sequences, a dynamic programming methodology is used to identify the maximum-likelihood phoneme concatenation corresponding to the unknown, spoken utterance.

The SOL measures may be derived from well-known continuous-density HMMs which offer high recognition accuracy. However, such a derivation requires intensive computations involving a large number of Gaussian kernels which are state dependent. As a result, the derivation incurs high computational cost, and substantial overheads in memory storage and access.

Attempts have been made to improve the efficiency of the derivation of the SOL measures. One such attempt involves use of tied-mixture HMMs, also known as semi-continuous HMMs. For details on the tied-mixture HMMs, one may refer to: X. Huang et al., "Semi-Continuous Hidden Markov Models for Speech Signals," *Computer Speech and Language*, vol. 3, 1989, pp. 239–251; and J. R. Bellegarda et al., "Tied Mixture Continuous Parameter Modeling for Speech Recognition," *IEEE Trans. Acoustics Speech Signal Process*, vol. 38, no. 12, 1990, pp. 2033–2045. Although they do not offer the recognition accuracy as high as the continuous-density HMMS, the tied-mixture HMMs all share the same collection of Gaussian kernels, which are state independent. As a result, among other things, less storage for the Gaussian kernels is required for the SOL derivation using the tied-mixture HMMs.

SUMMARY OF THE INVENTION

Despite the above-identified advantage of using tied-mixture HMMs, the computation of the SOL measure based on such HMMs is undesirably complex, stemming from use of a large number of mixture component weights associated with the Gaussian kernels in the computation. This large number of weights is attributed to the fact that the weights are state dependent. Concomitantly, the large number of mixture component weights require substantial storage space. As a result, the weights, together with the Gaussian kernels, are normally stored in an off-chip memory (i.e., external to a processor chip) which affords slow memory access.

In accordance with the invention, at least some of the mixture component weights are quantized, and can be efficiently stored as codewords representing the quantized weights. To that end, one or more of the mixture component weights whose values are different from a selected constant value (i.e., a quantization level value) are set to the selected constant value in the SOL computation. In accordance with an aspect of the invention, only the non-zero weights and the Gaussian kernels associated therewith are considered in the SOL computation. In accordance with another aspect of the invention, only a subset of the Gaussian kernels of significant values, regardless of the values of the associated weights, are considered in the SOL computation.

Thus, with the inventive techniques, the complexity of the SOL computation is reduced because of use of a relatively small number of the mixture component weights and Gaussian kernels, with respect to the traditional SOL computation. In addition, relative to the prior art technique, the inventive techniques require less storage for the mixture component weights and Gaussian kernels, thereby affording more efficient memory access.

BRIEF DESCRIPTION OF THE DRAWING

In the drawing,

FIG. 7 is a flow chart depicting a process for determining quantization levels for quantizing mixture component weights used in the fifth process.

DETAILED DESCRIPTION

Figure 1:
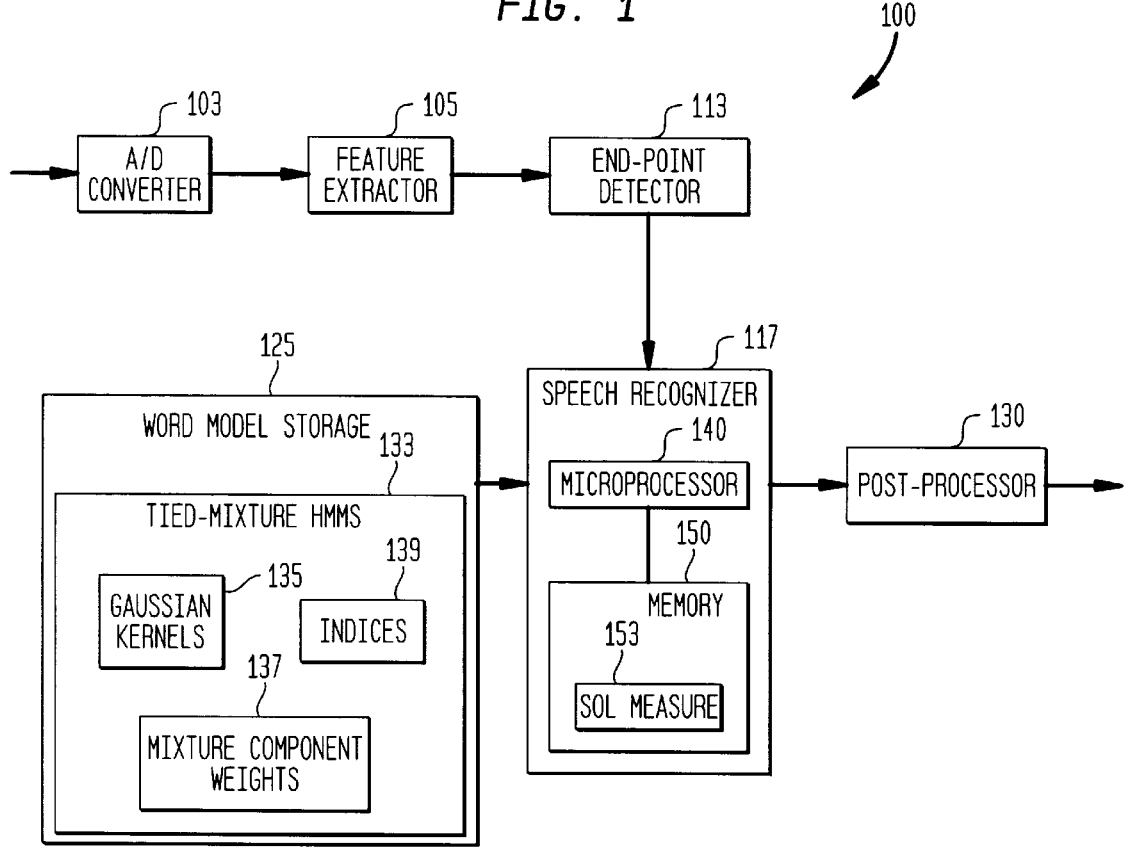
FIG. 1 is a block diagram of a speech recognition system in accordance with the invention.

FIG. 1 illustrates speech recognition system 100 embodying the principles of the invention. As shown in FIG. 1, system 100 includes a number of functional blocks including analog-to-digital (A/D) convertor 103, feature extractor 105, end-point detector 113, speech recognizer 117, word model storage 125 and post-processor 130. The functionality of each block of system 100 may be performed by a respective different processor, or the functionality of several or all blocks may be performed by the same processor. Furthermore, each stage can include multiple processing elements. The stages are pipelined and their operations are performed in a synchronous manner.

Specifically, input speech including a sequence of spoken words is provided, through a microphone (not shown), to A/D convertor 103 in system 100. Convertor 103 in a conventional manner samples the input speech. The digital samples are then provided to feature extractor 105.

Upon receiving the digital samples, feature extractor 105 organizes the received samples in speech frames of, say, 20 ms long, and derives for each frame a measure of energy in the frame and a set of short spectrum vectors, e.g., linear-predictive-coding (LPC) parameters. In this instance, the LPC parameters specify a spectrum of an all-pole model which best matches the signal spectrum over a period of time in which the frame of speech samples are accumulated. Based on the LPC parameters, extractor 105 produces a feature vector per frame, which comprises twelve cepstral features, twelve delta-cepstral features and a delta-energy feature. In a well-known manner, these cepstral and delta-cepstral features characterize the spectrum and its time variation of the speech frame. The delta-energy feature indicates an amount of change in energy in the speech frame from the previous frame.

End-point detector 113 of conventional design uses the delta energy feature, in conjunction with the energy measure by feature extractor 105, to determine the beginning and end of a speech signal. It then passes data signals containing the 25 features in each feature vector onto speech recognizer 117, along with any end-point determinations. Recognizer 117 includes microprocessor 140 and memory 150. Instructed by a control program which is stored in memory 150, microprocessor 140 performs speech recognition to be described. In particular, based on the aforementioned data signals and word models provided by word model storage 125, microprocessor 140 determines what the spoken words were in accordance with the invention.

Storage 125 contains tied-mixture hidden Markov models (HMMs) 133 for various spoken words which system 100 is capable of recognizing. Based on the Viterbi algorithm, recognizer 117 identifies an optimum sequence of HMMs which best matches, in a maximum likelihood sense, a respective concatenation of phonemes corresponding to an unknown spoken utterance. Such an identification process is realized by dynamic programming in a conventional manner. Based on the word models provided by storage 125, recognizer 117 forms a plurality of sequences of tentative decisions as to what the utterance was. These sequences of tentative decisions each have a cumulative state observation likelihood (SOL) measure (generically denoted 153) associated therewith, which is updated to reflect the cumulative conditional probability that the decision being made in a sequence would be correct given the acoustic input. In addition, the sequences respectively define the so-called "survival paths." The theory of the Viterbi algorithm predicts that the survival paths merge to the "maximum-likelihood path" going back in time. The maximum-likelihood path can be retraced to identify the maximum-likelihood, underlying speech unit which maximizes the conditional probability that it matches the unknown, spoken utterance given the acoustic input thereof.

Speech recognizer 117 feeds a series of recognized words to post-processor 130 for further processing. This further processing may include performing a well-known grammar check on the recognized words to improve the recognition accuracy. However, such further processing is deemed to be outside the scope of the invention, and its detailed description is thus omitted here.

The Viterbi update operation performed by microprocessor 140 in recognizer 117 at time t may be described using the following expression:

$$\log\delta_t(j) = \max_{1 \le i \le P}[\log\delta_{t-1}(i) + \log a_{ij}] + \log b_j(\vec{o}_t) \quad 1 \le j \le P, \quad (1)$$

where $\log\delta_t$ (j) represents the cumulative SOL measure (expressed in logarithm) along a survival path that ends in state j at time t, P represents the number of states in the word model under consideration, log $a_{ij}$ represents the state transition probability (expressed in logarithm) of going from state i to state j, $o_t$ represents the input feature vector to recognizer 117 at time t, and log $b_j$ ($o_t$) represents the SOL measure (expressed in logarithm) in state j.

Because of use of tied-mixture HMMs in this illustrative embodiment, the SOL measure in state j may be expressed as follows:

$$\log b_j(\vec{o}_t) = \sum_{s=1}^{S} \log\left[\sum_{m=1}^{M_s} \exp(\log c_{jms} + \log \mathbb{N}[\vec{o}_{ts}; \vec{\mu}_{ms}, \vec{\sigma}^2_{ms}])\right], \quad (2)$$

where j represents the state index and $1 \le j \le P$, S represents the number of streams into which the feature vector $\vec{o}_t$ is divided, $M_s$ represents the number of mixture components in a tied-mixture HMM for stream s, $c_{jms}$ represents the weight for mixture component m in state j and stream s. Illustratively, in system 100, components of each feature vector are sub-divided into three streams. Specifically, the twelve cepstral features in the feature vector are placed in a first stream, the twelve delta-cepstral features in a second stream, and the delta-energy feature in a third stream. For each stream s, a set of $M_s$ Gaussian kernel likelihoods $\mathbb{N}[\vec{o}_{ts}; \vec{\mu}_{ms}, \vec{\sigma}^2_{ms}]$'s is used, where $\vec{\mu}_{ms}$ and $\vec{\sigma}^2_{ms}$ vectors respectively represent the mean and variance characterizing the Gaussian kernels. Each kernel is assumed to have a diagonal covariance matrix, with $\sigma^2_{ms}$ being the diagonal elements therein. It should be noted that by virtue of the use of the tied-mixture HMMs, all the models desirably share the same sets of Gaussian kernels 135, independent of the state. In this instance, 256 kernels are used for each of the cepstral and delta-cepstral feature streams, and 32 kernels for delta-energy stream.

By rewriting expression (2) as follows:

$$\log b_j(\vec{o}_t) = \sum_{s=1}^{S} \log \left[ \sum_{m=1}^{M_s} c_{jms} \cdot \exp(\log \mathbb{N}[\vec{o}_{ts}; \vec{\mu}_{ms}, \vec{\sigma}^2_{ms}]) \right], \quad (3)$$

it is apparent that the exponential portion of expression (3) is independent of j and thus only needs to be computed once for all states. However, it is also apparent that each SOL computation according to expression (3) requires M evaluations of the kernel log-likelihoods, i.e., $\log \mathbb{N}[\vec{o}_{ts}; \vec{\mu}_{ms}, \vec{\sigma}^2_{ms}]$'s, each of which is followed by the exponential operation on the evaluated likelihood, where:

$$M = \sum_{s=1}^{S} M_s. \quad (4)$$

Moreover, S logarithmic operations, M multiplications and [M−1] additions are further needed for the SOL computation.

Despite the use of the tied-mixture HMMs here, since the number of the mixture component weights $c_{jms}$'s involved in the above SOL computation in each state is usually high (544 in this instance), we realize that the computational complexity and memory access requirement in such a computation remain to be less than desirable. Thus, it is an object of the invention to reduce the number of the kernel likelihoods used in the SOL computation to improve the computational complexity and memory access requirement. It is another object of the invention to reduce the number of mixture component weights used in the SOL computation and/or the required storage therefor to achieve lower computational cost and higher memory access efficiency.

Figure 2:
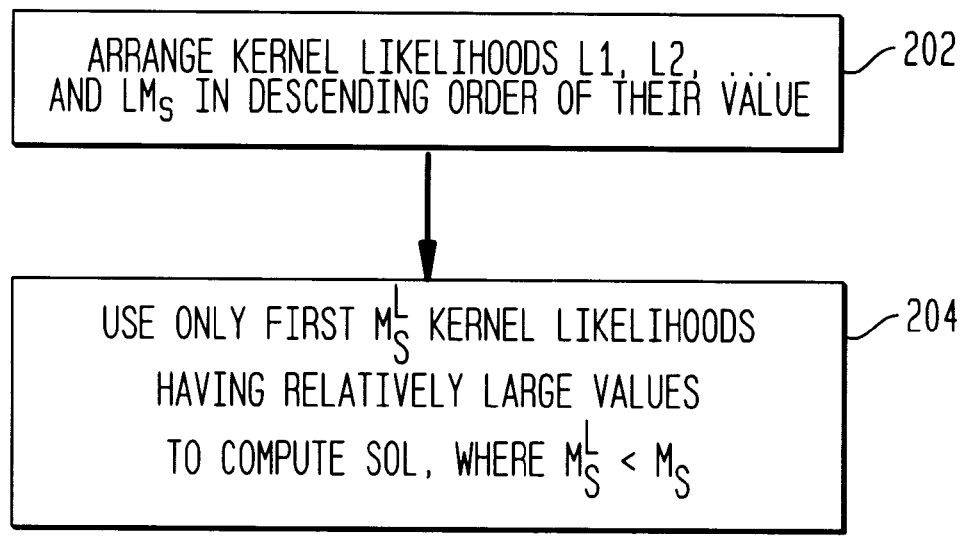
FIG. 2 is a flow chart depicting a first process which may be employed in the system of FIG. 1 for selecting Gaussian kernels in deriving an SOL measure in accordance with a first aspect of the invention.
Figure 3:
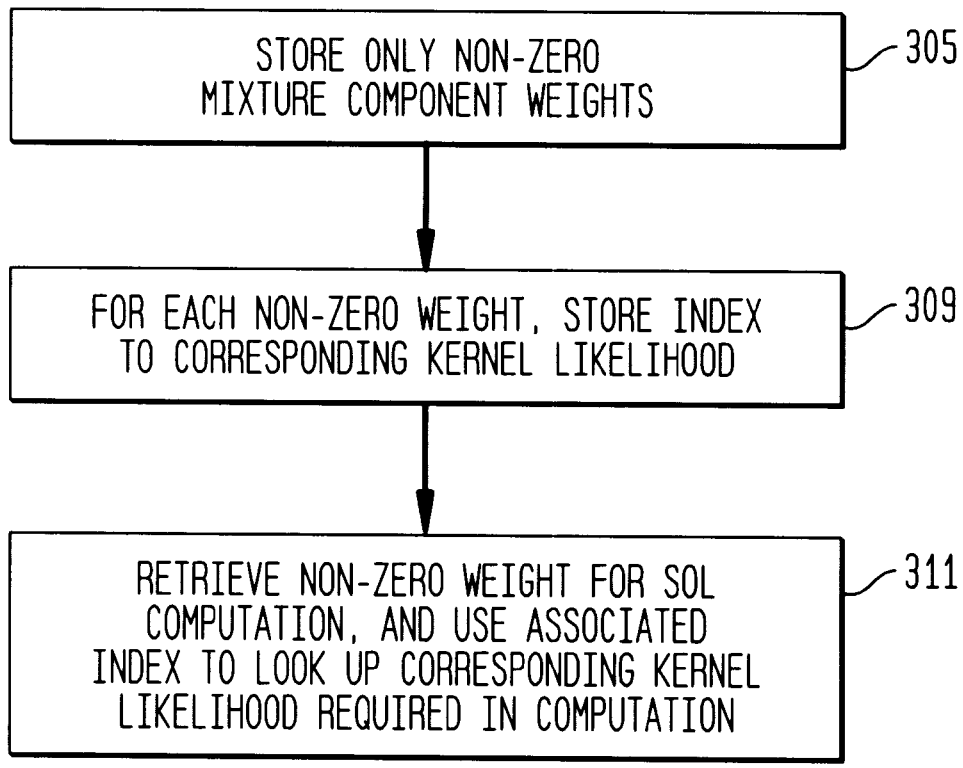
FIG. 3 is a flow chart depicting a second process which may be employed in the system of FIG. 1 for using non-zero mixture component weights in deriving an SOL measure in accordance with a second aspect of the invention.

In accordance with the invention, only a selected number of significant kernel likelihood values are selected for use in computing the SOL. To that end, for each stream s, the kernel likelihoods, denoted L1, L2 . . . , and LM$_s$, are arranged in descending order of their value as indicated at step 202 in FIG. 2. Only the first $M^L_s$ kernel likelihoods having relatively large values are used in the SOL computation at step 204, where $M^L_s < M_s$. In effect, the above expression (2) becomes:

$$\log b_j(\vec{o}_t) = \sum_{s=1}^{S} \log \left[ \sum_{m=1}^{M^L_s} c_{jms} \cdot \exp(\log \mathbb{N}[\vec{o}_{ts}; \vec{\mu}_{ms}, \vec{\sigma}^2_{ms}]) \right], \quad (5)$$

with the bracketed sum having the index m truncated, where 1≤j≤P. Accordingly, fewer mixture component weights $c_{jms}$ are required in the truncated sum in expression (5), and thus needed to be stored. As such, the inventive technique affords not only a reduction in computational complexity, but also efficient memory access to the requisite mixture component weights.

It should be noted that the above approach where all Gaussian kernel likelihoods are required to be evaluated, followed by selection of the most significant $M^L_s$ likelihoods, may be inefficient. Rather, in practice, Gaussian kernels are grouped in a small predetermined number of clusters in storage 125. Each cluster is signified by a centroid of all kernels assigned to the cluster. Such a centroid may be evaluated using the well-known LBG algorithm described in: Y. Linde et al., "An Algorithm for Vector Quantizer design," *IEEE Trans. Communications*, vol. COM-28, pp. 84–95, January 1980. In this instance, the centroid is a vector representing a median of the respective means of the kernels belonging to the cluster. Only those kernels of the clusters whose centroids are "close" (within a predetermined Euclidean distance) to the input feature vector are accessed by microprocessor 140 for evaluation of the corresponding likelihoods. Because not all the kernel likelihoods need to be evaluated, the memory access efficiency and computational complexity are further improved.

In a command-word recognition experiment using system 100 in accordance with the invention, we found that very few, significant kernel likelihoods were required to obtain a recognition accuracy comparable to that of a prior art system using every kernel likelihood. On the other hand, in a more complex connected digit recognition experiment, many more kernel likelihoods, and thus mixture components weights, needed to be retained to achieve the comparable recognition accuracy.

Compression techniques for reducing the required storage for mixture component weights in accordance with the invention will now be described. In a tied-mixture HMM based system, such as system 100, the requirements of storage (e.g., storage 125) are dominated by the mixture component weights, denoted 137. However, we have recognized that the values of many mixture component weights are usually zero or extremely small, stemming from a kernel being too "far" from a state in the feature space or due to a lack of enough training data for that state. For example, in the above command-word and connected digits recognition experiments, we found that the values of 40–50% of the mixture component weights were virtually zero.

In accordance with a first inventive technique, referred to as the "Lossless Weight Storage Reduction" technique, only non-zero mixture component weights are stored in storage 125 to save memory space as indicated in step 305. For each non-zero weight value, at step 309 an index to the corresponding kernel likelihood is also stored thus indices 139 in storage 125. As the non-zero weight is retrieved by microprocessor 140 in the SOL computation, the associated index is used to look up the corresponding kernel likelihood required in the computation as indicated at step 311.

Let $M^z_{js}$ represent the number of non-zero weights stored for each stream s and state j. In this instance, the storage requirement ($M_w$) for the mixture component weights for each word model (w) is as follows:

$$M_w = \sum_{s=1}^{S} \sum_{j=1}^{P} M^z_{js} \text{ weights} + \left[ \sum_{s=1}^{S} \sum_{j=1}^{P} (1 + M^z_{js}) \right] \text{ indices}, \quad (6)$$

where P is the number of states in the model. It should be noted that if the number of Gaussian kernels for each stream does not exceed 256, which is the case of system 100, each index can be stored as a byte.

Figure 4:
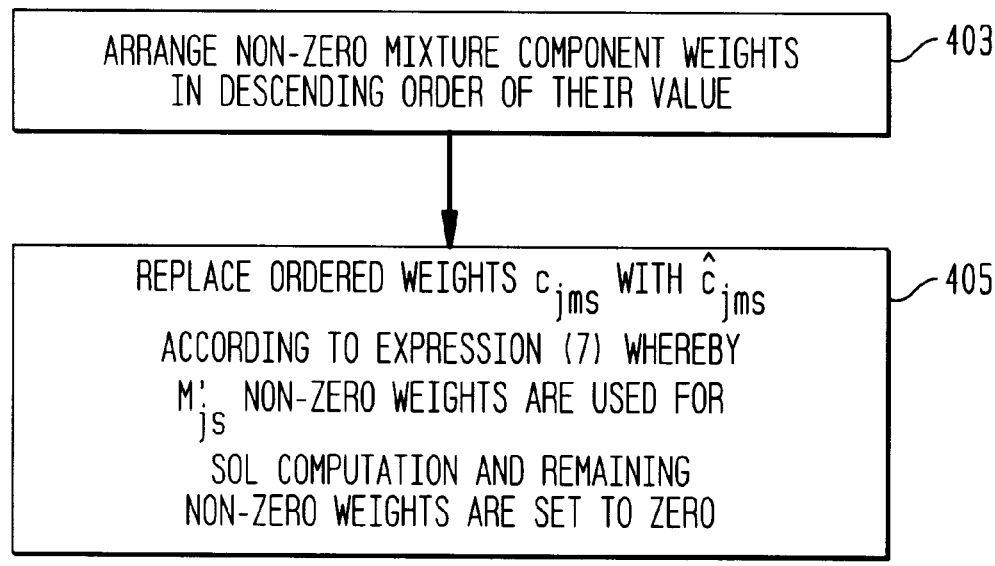
FIG. 4 is a flow chart depicting a third process which may be employed in the system of FIG. 1 for using selected non-zero mixture component weights in deriving an SOL measure in accordance with a third aspect of the invention.

To reduce $M_w$, a second inventive compression technique may be applied in system 100. In accordance with this inventive technique, a smaller number (say $M'_{js}$) of non-zero mixture component weights of significant values are used. Specifically, these weights are first arranged in descending order of their value as indicated at step 503 in FIG. 4. Only the mixture component weights having largest values are included in the SOL computation. In other words, the weights $c_{jms}$ in equation (3) are replaced at step 405 by $\hat{c}_{jms}$ which are defined as follows:

$$\hat{c}_{jms} = \begin{cases} c_{jms} \Big/ \sum_{m=1}^{M'_{js}} c_{jms} & m \le M'_{js} \\ 0 & m > M'_{js} \end{cases} \quad (7)$$

Note that in expression (7) the selected $M'_{js}$ non-zero mixture component weights are normalized so that they sum to one. The kernel likelihoods are indexed as before to facilitate the retrieval thereof, along with the corresponding mixture component weights. In this instance, the required storage for the mixture component weights for each word model w is:

$$M_w = \sum_{s=1}^{S} \sum_{j=1}^{P} M'_{js} \text{ weights} + \left[ \sum_{s=1}^{S} \sum_{j=1}^{P} (1 + M'_{js}) \right] \text{ indices.} \quad (8)$$

Since $M'_{js} < M^z_{js}$, it is clear that the memory requirements $M_w$ is reduced. It is also clear that the recognition accuracy varies with the selected value of $M'_{js}$.

In an alternative embodiment, a variable number of mixture component weights are used in the SOL computation such that the sum of the weights is greater than or equal to a specified value $\pi$, which is smaller than one. That is, $$M'_{js} < M^z_{js}, \text{ such that } \sum_{m=1}^{M'_{js}} c_{jms} \ge \eta. \quad (9)$$

In a speech recognition experiment using the alternative embodiment, if we used a conservative $\pi$, we achieved a reduction of about 30% in storage for the mixture component weights without significant loss of recognition accuracy, with respect to the system where all non-zero component weights are stored. In any event, it is clear that a large number of mixture component weights need to be retained to maintain such accuracy.

However, we have realized that setting small mixture component weights to zero, regardless of the corresponding kernel likelihoods, causes elimination of otherwise non-zero contributions to the SOL computation. In general, the dynamic range of kernel likelihood values is much larger than that of mixture component weight values. Thus, when mixture component weights associated with kernel likelihoods of significant values are artificially set to zero, a substantial error is introduced into the SOL computation. In other words, "good" survival paths are incorrectly pruned in the recognition process, jeopardizing the recognition accuracy.

Figure 5:
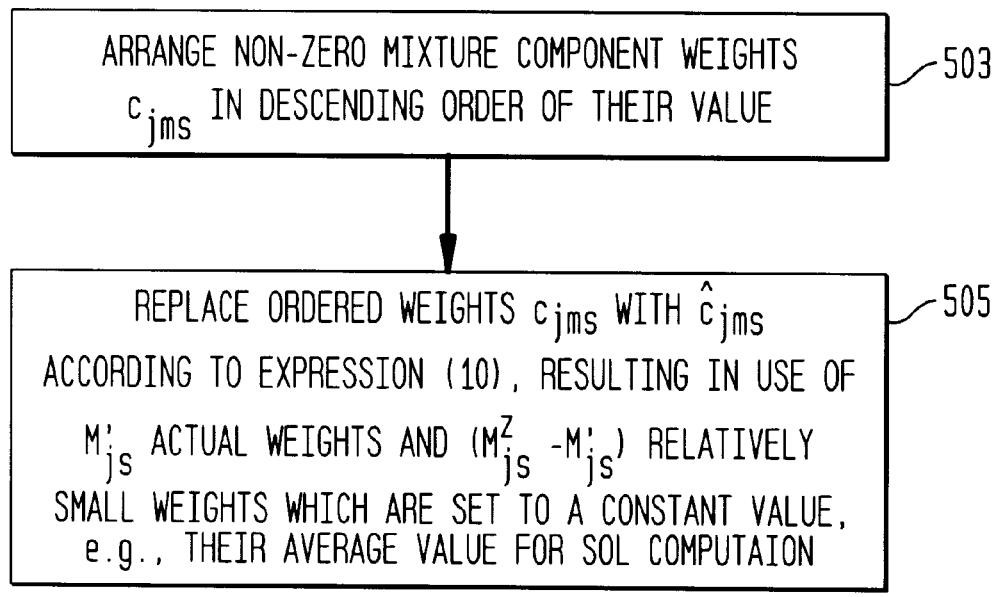
FIG. 5 is a flow chart depicting a fourth process which may be employed in the system of FIG. 1 for using selected non-zero mixture component weights, and mixture component weights which are set to a constant value in deriving an SOL measure in accordance with a fourth aspect of the invention.

In accordance with an aspect of the invention, such recognition accuracy is improved by approximating small non-zero mixture component weights with a non-zero constant, instead of artificially setting them to zero. To that end, the weights $c_{jms}$ are arranged in descending order of their value as indicated at step 503 in FIG. 5, and then replaced at step 505 by $\hat{c}_{jms}$ which are defined as follows:

$$\hat{c}_{jms} = \begin{cases} c_{jms} & m \le M'_{js} \\ \dfrac{1}{(M^z_{js} - M'_{js})} \sum_{m=M'_{js}+1}^{M^z_{js}} c_{jms} & M'_{js} < m \le M^z_{js} \\ 0 & m > M^z_{js}, \end{cases} \quad (10)$$

where $M^z_{js}$ represents the number of non-zero weights for state j and stream s as described before, and $M'_{js}$ represents the number of mixture component weights whose actual weights are used. The values of the remaining $(M^z_{js} - M'_{js})$ relatively small weights are each set to a constant, which in this instance is their average value. In this example, the required storage for mixture component weights for each word model w becomes:

$$M_w = \sum_{s=1}^{S} \sum_{j=1}^{P} (1 + M'_{js}) \text{ weights} + \sum_{s=1}^{S} \sum_{j=1}^{P} (2 + M^z_{js}) \text{ indices.} \quad (11)$$

Compared with expression (8), the additional terms in expression (11) are attributed to the storage requirement of the constant value assigned to the $(M^z_{js} - M'_{js})$ relatively small weights which are not accounted for previously, and the indices for such weights. However, it should be noted that the value of $M'_{js}$ in expression (10) may be much smaller than that in expression (7) to achieve the same recognition accuracy. As such, the required storage here may actually be less than that in the previous embodiment, despite the additional terms.

Figure 6:
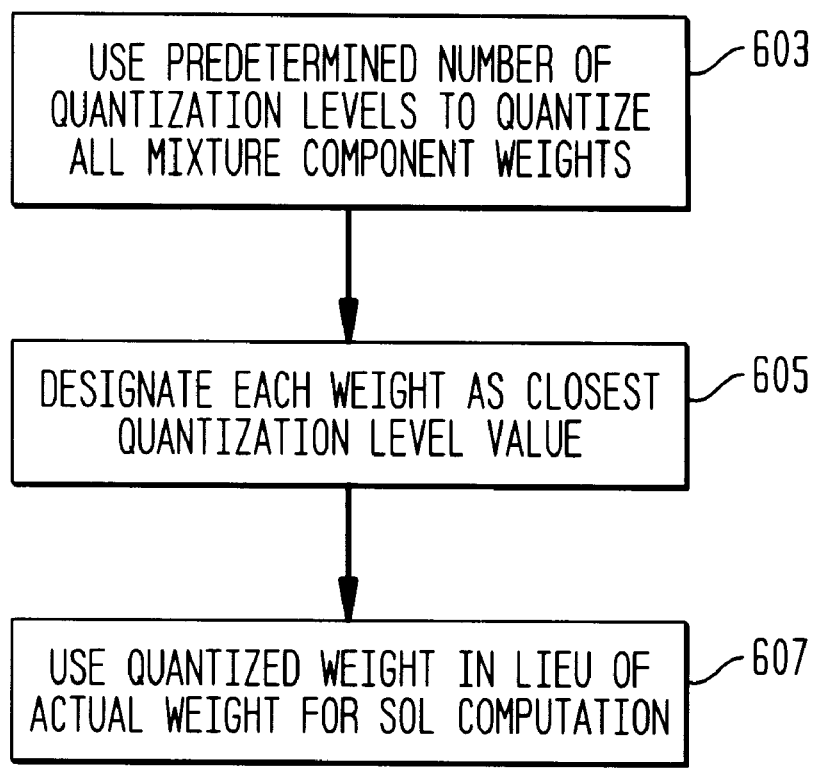
FIG. 6 is a flow chart depicting a fifth process which may ve employed in the system of FIG. 1 for using quantized mixture component weights in deriving an SOL measure in accordance with a fifth aspect of the invention.

Referring to expression (10), the process where those mixture component weights below a specified threshold are each designated the same average value can be envisioned as one of quantization where the weights are quantized using a single quantization level (i.e., the average weight value). In accordance with a further aspect of the invention, such a quantization process is extended to include all mixture component weights. That is, all the weights are quantized using a predetermined number of quantization levels as indicated at step 603 in FIG. 6. Each weight is designated at step 605 the closest quantization level value, and the quantized weight is used in lieu of the actual weight in the SOL computation at step 607. Furthermore, each weight can be represented by a codeword indicating the corresponding quantized weight. The number of codewords needed equals the number of quantization levels used. Advantageously, storage of the weights by their codewords, which are integers, are much more efficient than that by their actual weight values as in the prior art, which are floating point numbers. For example, if no more than 256 quantization levels used, each codeword can be stored as a byte. Despite the fact that a look-up table is also needed here for looking up a given codeword for the corresponding quantized weight, the total required storage is relatively small and can be accommodated by an on-chip memory, thereby affording efficient memory access. Such an on-chip memory may be a random-access memory (RAM) internal to recognizer 117.

Given the mixture component weights, the values of the quantization levels are determined using the aforementioned LBG algorithm to minimize the total quantization error. FIG. 7 is a flow chart depicting process 200 according to the LBG algorithm for obtaining the quantization level values. Process 200 is an iterative process. To initialize the process, a value between zero and the maximum mixture component weight value is selected as a tentative quantization level value, as indicated at step 203. For example, the average weight value may be used as the initial tentative quantization level value.

At step 205, for each mixture component weight $c_i$ ($1 \leq i \leq I$), the closest tentative quantization level $\hat{c}^i$ is found among the L tentative quantization levels provided in the previous step (in the first iteration L=1), where I represents the total number of the mixture component weights in the SOL computation. A function $d(\hat{c}, c_i)$ is used to measure the distance of a mixture component weight ($c_i$) from a quantization level ($\hat{c}$), and thus the quantization error associated with $c_i$. Illustratively, the so-called "$\mathscr{L}^1$" distance measure is used in this instance, and accordingly $d(\hat{c},c_i)$ equals the absolute value of the difference between $\hat{c}$ and $c_i$. That is, $d(\hat{c},c_i)=|\hat{c}c_i|$.

It should be noted at this point that the so-called "$\mathscr{L}^2$" distance measure may also be used, instead, which measures the Euclidean distance between two given points.

At step 207, a first cumulative quantization error (D1) is computed as follows:

$$\sum_{i=1}^{I} d(\hat{c}^i, c_i). \tag{12}$$

At step 209, by perturbing the L tentative quantization levels in accordance with the LBG algorithm, L centroids $\dot{c}_1, \dot{c}_2 \ldots$, and $\dot{c}_L$ corresponding thereto are determined to "minimize" a second cumulative quantization error (D2). It should be noted that the LBG algorithm only guarantees a local minimum. That is, the "minimized" D2 probably can be improved. In any event, the "minimized" D2 is computed at step 210 as follows:

$$\sum_{i=1}^{I} d(\dot{c}^i, c_i), \tag{13}$$

where $\dot{c}^i$ represents the centroid to which $c_i$ is closest.

At step 211, a converging factor (D1−D2)/D1 is used to determine whether an additional iteration is needed to improve D2. Specifically, if this factor is greater than or equal to a predetermined threshold $\mu$, where $0<\mu<1$ (e.g., $\mu=0.01$), process 200 returns to step 205 through step 212 to reduce D2. At step 212, the L centroids are designated to be the tentative quantization levels for step 205.

Otherwise if the converging factor is smaller than $\mu$, it is determined at step 213 whether L equals the desired number of quantization levels, say, Q. If $L \neq Q$ (i.e., L<Q), process 200 proceeds to step 215 where the above centroids are used as tentative quantization levels, and new tentative quantization levels are added to increase L. For example, a way to increase the number of the tentative quantization levels using the centroids is that the first new tentative quantization level is assigned half the value of the smallest centroid. Each additional new tentative quantization level is assigned the average value of a respective pair of contiguous centroids. The increased number of tentative quantization levels are then provided to step 205 previously described. If L=Q at step 213, the centroids from step 209 are used as the respective Q quantization levels to quantize all the mixture component weights, as indicated at step 217. In addition to the Q quantization levels used, a quantization level of value zero is also used. As such, certain small non-zero weights closest to the zero quantization level, together with the zero weights, are quantized to the zero value.

Figure 8:
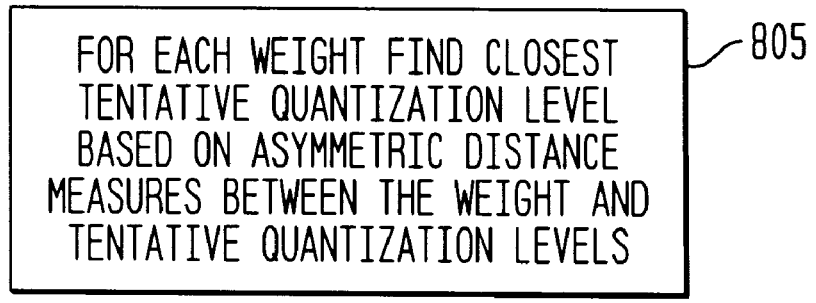
FIG. 8 illustrates a substitute step for use in the process of FIG. 7.

Referring back to expression (3), the mixture components weights $c_{jms}$ are subject to a logarithmic operation which is a nonlinear operation. This being so, a logarithmic singular effect occurs especially when Q is small. This effect is caused by the logarithmic operation's amplifying the quantization errors of small quantized weights in a disproportionate manner, with respect to those of relatively large quantized weights. To avoid the logarithmic singularity effect, the distance (or quantization error) measure $d(\hat{c},c)$ used in process 200 for deriving the quantization levels should not be the $\mathscr{L}^1$ distance measure. Rather, the following asymmetric distance measure should be used, instead as shown at step 805 in FIG. 8 for substituting step 205 in FIG. 7:

$$d(\hat{c}, c) = \left( \xi c \left| \log\left(1 + \frac{\hat{c}-c}{\xi c + \zeta}\right) \right| \right)^{\rho}, \tag{14}$$

where $\rho=1$ or 2, $\xi \geq 1$, and $\zeta>0$. The parameters $\xi$ and $\zeta$ are used to control the behavior of $d(\hat{c},c)$. In addition, the parameter $\zeta$ determines the range of "very small" weights. If $\xi c<<\zeta$ then $|\Delta c|=|\hat{c}-c| \leq |c| \leq \xi c<<\zeta$, and $d(\hat{c},c)$ may be approximated as follows:

$$d(\hat{c}, c) \approx \left( \frac{\xi c}{\zeta} |\hat{c}-c| \right)^{\rho}. \tag{15}$$

On the other hand, if $\xi c>>\zeta$, $d(\hat{c},c)$ may be approximated as follows:

$$d(\hat{c}, c) = \left| \Delta c + \sum_{k=1}^{\infty} \left( \frac{\Delta c}{2k+1} - \frac{\xi c}{2k} \left(\frac{\Delta c}{\xi c}\right)^{2k} \right) \right|^{\rho}, \tag{16}$$

Based on expression (16), if $|\Delta c|<<\xi c$, it can be shown that $d(\hat{c},c) \approx |\hat{c}-c|^{\rho}$, which is the $\mathscr{L}^{\rho}$ distance. If $|\Delta c|$ is not small enough, and $\Delta c$ is negative (positive), it can be shown that the error $d(\hat{c},c)$ increases significantly (decreases to a lesser extent). Thus, the parameter $\xi$ determines the degree of asymmetry of $d(\hat{c},c)$. Specifically, as $\xi$ gets larger, $d(\hat{c},c)$ becomes less asymmetric.

The foregoing merely illustrates the principles of the invention. It will thus be appreciated that a person skilled in the art will be able to devise numerous systems which, although not explicitly shown or described herein, embody the principles of the invention and are thus within its spirit and scope.

For example, it will be appreciated that a person skilled in the art may further reduce the complexity of the SOL computation by combining two or more inventive techniques. For instance, the mixture component weight quantization technique described above may be combined with a second technique according to expression (5) wherein only a predetermined number of significant weights are used in the SOL computation. Thus, in accordance with such a combined technique, not all of the mixture components weights are quantized in performing the SOL computation. Rather, those insignificant weights are totally ignored and only the remaining weights are quantized in performing such a computation.

We claim:

1. A speech recognizer comprising:
   a processor responsive to a representation of speech for deriving at least one state observation likelihood measure, each state observation likelihood measure being a function of at least a plurality of probability kernels and a plurality of weights associated therewith, one or more of the weights whose values are different from a selected constant value being set to the selected constant value in deriving the state observation likelihood measure; and an output for generating signals representative of recognized speech based on the at least one state observation likelihood measure.

2. The speech recognizer of claim 1 wherein the selected constant value is zero.

3. The speech recognizer of claim 1 wherein the values of the one or more of the weights are non-zero, the selected constant value being an average of the values of the one or more of the weights.

4. The speech recognizer of claim 1 wherein selected ones of the plurality of weights, other than the one or more of the weights, are set to at least one other selected constant value in deriving the state observation likelihood measure.

5. The speech recognizer of claim 4 wherein the selected constant value and the at least one other selected constant value are selected in accordance with an LBG algorithm.

6. The speech recognizer of claim 4 wherein the one or more of the weights are closer, in terms of a distance measure, to the selected constant value than to each of the at least one other selected constant value.

7. The speech recognizer of claim 6 wherein said distance measure is an absolute value distance measure.

8. The speech recognizer of claim 6 wherein said distance measure is asymmetric.

9. The speech recognizer of claim 1 wherein said probability kernels are Gaussian kernels in accordance with tied-mixture hidden Markov models (HMMs).

10. The speech recognizer of claim 1 wherein said weights are mixture component weights in accordance with tied-mixture HMMs.

11. A speech recognizer comprising:

a processor responsive to a representation of speech for deriving at least one state observation likelihood measure, each state observation likelihood measure being a function of at least a plurality of probability kernels and a plurality of weights, each probability kernel being associated with a respective one of the weights, only the probability kernels associated with those weights whose values are non-zero being identified by respective indexes;

a repository for providing each non-zero weight and an index identifying the probability kernel associated with the non-zero weight for deriving the at least one state observation likelihood measure; and an output for generating signals representative of recognized speech based on the at least one state observation likelihood measure.

12. The speech recognizer of claim 11 wherein said probability kernels are Gaussian kernels in accordance with tied-mixture HMMs.

13. The speech recognizer of claim 11 wherein said weights are mixture component weights in accordance with tied-mixture HMMs.

14. Apparatus for recognizing speech based on at least one state observation likelihood measure, each state observation likelihood measure being a function of at least a plurality of probability kernels and a plurality of weights associated therewith, comprising:

a processor for deriving the at least one state observation likelihood measure based on a subset of the plurality of probability kernels, each probability kernel in the subset being a function of a representation of the speech to be recognized, the number of probability kernels in the subset being predetermined, the predetermined number being smaller than the number of the plurality of probability kernels, the probability kernels in the subset each having a larger value than any of the probability kernels outside the subset; and an output for generating signals representative of recognized speech based on the at least one state observation likelihood measure.

15. The apparatus of claim 14 wherein said probability kernels are Gaussian kernels in accordance with tied-mixture HMMs.

16. The apparatus of claim 14 wherein said weights are mixture component weights in accordance with tied-mixture HMMs.

17. A method for recognizing speech comprising:

deriving at least one state observation likelihood measure in response to a representation of said speech, each state observation likelihood measure being a function of at least a plurality of probability kernels and a plurality of weights associated therewith, one or more of the weights whose values are different from a selected constant value being set to the selected constant value in deriving the state observation likelihood measure; and generating signals representative of recognized speech based on the at least one state observation likelihood measure.

18. The method of claim 17 wherein the selected constant value is zero.

19. The method of claim 17 wherein the values of the one or more of the weights are non-zero, the selected constant value being an average of the values of the one or more of the weights.

20. The method of claim 17 wherein selected ones of the plurality of weights, other than the one or more of the weights, are set to at least one other selected constant value in deriving the state observation likelihood measure.

21. The method of claim 20 wherein the selected constant value and the at least one other selected constant value are selected in accordance with an LBG algorithm.

22. The method of claim 20 wherein the one or more of the weights are closer, in terms of a distance measure, to the selected constant value than to each of the at least one other selected constant value.

23. The method of claim 22 wherein said distance measure is an absolute value distance measure.

24. The method of claim 22 wherein said distance measure is asymmetric.

25. The method of claim 17 wherein said probability kernels are Gaussian kernels in accordance with tied-mixture hidden Markov models (HMMs).

26. The method of claim 17 wherein said weights are mixture component weights in accordance with tied-mixture HMMs.

27. A method for recognizing speech comprising:

deriving at least one state observation likelihood measure in response to a representation of said speech, each state observation likelihood measure being a function of at least a plurality of probability kernels and a plurality of weights, each probability kernel being associated with a respective one of the weights, only the probability kernels associated with those weights whose values are non-zero being identified by respective indexes;

providing each non-zero weight and an index identifying the probability kernel associated with the non-zero weight for deriving the at least one state observation likelihood measure; and generating signals representative of recognized speech based on the at least one state observation likelihood measure.

28. The method of claim 27 wherein said probability kernels are Gaussian kernels in accordance with tied-mixture HMMs.

29. The method of claim 27 wherein said weights are mixture component weights in accordance with tied-mixture HMMs.

30. A method for recognizing speech based on at least one state observation likelihood measure, each state observation likelihood measure being a function of at least a plurality of probability kernels and a plurality of weights associated therewith, comprising:

deriving the at least one state observation likelihood measure based on a subset of the plurality of probability kernels, each probability kernel in the subset being a function of a representation of the speech to be recognized, the number of probability kernels in the subset being predetermined, the predetermined number being smaller than the number of the plurality of probability kernels, the probability kernels in the subset each having a larger value than any of the probability kernels outside the subset; and an output for generating signals representative of recognized speech based on the at least one state observation likelihood measure.

31. The method of claim 30 wherein said probability kernels are Gaussian kernels in accordance with tied-mixture HMMs.

32. The method of claim 30 wherein said weights are mixture component weights in accordance with tied-mixture HMMs.

* * * * *